United States Patent
Porter et al.

(10) Patent No.: US 10,544,022 B2
(45) Date of Patent: Jan. 28, 2020

(54) HANDLE POSITION SENSING SYSTEMS AND METHODS FOR A MATERIAL HANDLING VEHICLE

(71) Applicant: THE RAYMOND CORPORATION, Greene, NY (US)

(72) Inventors: Randy David Porter, Greene, NY (US); Joshua Daniel Vanderpool, Windsor, NY (US)

(73) Assignee: The Raymond Corporation, Greene, NY (US)

( * ) Notice: Subject to any disclaimer, the term of this patent is extended or adjusted under 35 U.S.C. 154(b) by 184 days.

(21) Appl. No.: 15/782,289

(22) Filed: Oct. 12, 2017

(65) Prior Publication Data

US 2018/0105407 A1 Apr. 19, 2018

Related U.S. Application Data (60) Provisional application No. 62/407,683, filed on Oct. 13, 2016.

(51) Int. Cl.
*B66F 9/075* (2006.01)
*B62D 1/12* (2006.01)
(Continued)

(52) U.S. Cl.
CPC ............ *B66F 9/07568* (2013.01); *B62D 1/12* (2013.01); *B62D 6/10* (2013.01); *B66F 9/0759* (2013.01); *B66F 9/20* (2013.01)

(58) Field of Classification Search
CPC ......... B62D 1/12; B62D 6/10; B66F 9/07568; B66F 9/0759
See application file for complete search history.

(56) References Cited

U.S. PATENT DOCUMENTS 5,265,021 A   11/1993   Avitan
6,135,694 A   10/2000   Trego et al.
(Continued)

FOREIGN PATENT DOCUMENTS

DE   102009042091 A1   3/2011
EP       0545676 A1   6/1993
(Continued)

OTHER PUBLICATIONS

Extended European Search Report issued in corresponding European Application No. 17196226.9, dated Mar. 14, 2018, 7 pages.
(Continued)

*Primary Examiner* — Faye M Fleming
(74) *Attorney, Agent, or Firm* — Quarles & Brady LLP (57) ABSTRACT

Provided are systems and methods for monitoring the position of a handle of a material handling vehicle comprising a handle, a first sensor positioned along the material handling vehicle, a second sensor positioned along the handle, and a controller configured to retrieve first positional information from the first sensor, retrieve second positional information from the second sensor, and compare the first positional information with the second positional information. The controller can adjust the operation of at least one of a lift motor and a drive motor of the material handling vehicle based on the comparison of the first positional information with the second positional information.

17 Claims, 5 Drawing Sheets

(51) Int. Cl.
  *B62D 6/10* (2006.01)
  *B66F 9/20* (2006.01)

(56) References Cited

U.S. PATENT DOCUMENTS

| | | |
|---|---|---|
| 6,299,139 B1 | 10/2001 | Kazerooni |
| 6,738,691 B1 | 5/2004 | Colgate et al. |
| 6,886,812 B2 | 5/2005 | Kazerooni |
| 7,775,317 B1 | 8/2010 | Goodwin et al. |
| 8,392,049 B2 | 3/2013 | Goodwin et al. |
| 8,504,241 B2 | 8/2013 | Hanna et al. |
| 8,666,618 B2 | 3/2014 | Lin et al. |
| 8,751,095 B2 | 6/2014 | Goodwin et al. |
| 9,309,099 B2 | 4/2016 | Dal Dosso et al. |
| 2006/0283280 A1 | 12/2006 | Szymanski et al. |
| 2017/0050667 A1 | 2/2017 | Kuramitsu et al. |
| 2017/0066636 A1* | 3/2017 | Xiaoxian ............ B66F 9/07568 |
| 2017/0191244 A1* | 7/2017 | Berkemeier .......... E02F 9/2045 |
| 2019/0071113 A1* | 3/2019 | Board .................... B62D 1/11 |

FOREIGN PATENT DOCUMENTS

| | | |
|---|---|---|
| EP | 1505035 A2 | 2/2005 |
| EP | 0926042 B2 | 5/2011 |
| EP | 2733268 A2 | 5/2014 |
| EP | 2733268 A3 | 9/2017 |
| GB | 2457803 A | 9/2009 |

OTHER PUBLICATIONS

European Communication pursuant to Article 94(3) EPC issued in corresponding European Application No. 17196226.9, dated May 8, 2019, 6 pages.

\* cited by examiner

HANDLE POSITION SENSING SYSTEMS AND METHODS FOR A MATERIAL HANDLING VEHICLE

CROSS REFERENCE TO RELATED APPLICATIONS

This application claims the benefit of U.S. Provisional Patent Application Ser. No. 62/407,683, filed Oct. 13, 2016, and entitled "Handle Position Sensing Systems and Methods for a Material Handling Vehicle," which is hereby incorporated by reference in its entirety.

STATEMENT OF FEDERALLY SPONSORED RESEARCH OR DEVELOPMENT

Not applicable.

FIELD OF THE INVENTION

The present disclosure relates to systems and methods for monitoring one or more positions of a control handle of a material handling vehicle as disclosed herein.

BACKGROUND

Material handling vehicles are commonly found in warehouses, factories, shipping yards, and, generally, wherever pallets, large packages, or loads of goods are required to be transported from place to place. Material handling vehicles typically include load-bearing forks for lifting packages or pallets for transporting, a drive motor for propelling the truck, a steering control mechanism, an operator compartment, and a brake. A user or operator of the material handling vehicle may stand or sit within the operator compartment during use.

When a material handling vehicle is in use, the operator controls the functionality of the vehicle via the manipulation of an array of controls, levers, wheels, and switches for driving the vehicle forward and backward, steering the vehicle, and raising and lowering the forks, among other things. One or more of these controls typically involves the use of one or more control handles, which may include an arm that is pivotable about a pivot point. Information related to the position of the one or more control handles is sent to a truck control system, or a controller or processor, which processes this information during operation of the material handling vehicle.

Current control handles provide information in a binary fashion. In this sense, typical control handles use a cam on a tiller to indicate that the handle is in the operating region or that the handle is not in the operating region. This binary signal does not indicate the absolute and/or continuous angle of the handle position. As such, the truck control system of the material handling vehicle does not receive information regarding the absolute and continuous position of the control handle, and the angular rate of change of the handle.

Therefore, it is desirable to provide systems and methods for sensing the position of one or more control handles provided on a material handling vehicle to provide information related to the angular position and angular rate of change of the one or more control handles.

SUMMARY OF THE INVENTION

The present disclosure provides for systems and methods of periodically and/or continuously monitoring the position of an operator handle of a material handling vehicle with two or more sensors.

In some forms, a system for monitoring a position of a handle includes a mounting block, an arm pivotally connected with the mounting block, a first sensor positioned along the mounting block, a second sensor position along the arm, and a controller. The controller is configured to retrieve a first signal indicative of a first position from the first sensor, retrieve a second signal indicative of a second position from the second sensor, retrieve a third signal indicative of a third position from the first sensor, retrieve a fourth signal indicative of a fourth position from the second sensor, and compare the first position with the third position, and the second position with the fourth position. In some embodiments, the first sensor is an accelerometer and the second sensor is an accelerometer.

In some embodiments, one of the first sensor or the second sensor is a gyroscope. In some embodiments, the controller is further configured to output a command to a truck control system based on the comparison of the first position with the third position and the second position with the fourth position. In some embodiments, the system further includes a grip provided at a distal end of the arm. In some forms, the controller is further configured to output information to a user interface related to the comparison of the first position with the third position and the second position with the fourth position. In some embodiments, the controller is further configured to adjust operation of one or more of a lift motor or a drive motor based on the comparison of the first position with the third position and the second position with the fourth position. In some embodiments, the controller is further configured to recalibrate the first sensor and the second sensor.

In other embodiments, a system for monitoring a position of a drive component of a material handling vehicle includes a drive component, a first sensor positioned along the material handling vehicle, a second sensor positioned along the drive component, and a controller configured to retrieve first positional information from the first sensor, retrieve second positional information from the second sensor, and compare the first positional information with the second positional information. In some embodiments, the drive component is a handle. In some embodiments, the second sensor is positioned along a grip of the handle and the first sensor is positioned along a mounting block of the handle. In some embodiments, the handle operates at least one of a lift motor and a drive motor of the material handling vehicle. In some forms, the controller is further configured to monitor operational conditions of the material handling vehicle. In some embodiments, the controller is a truck control system.

In other embodiments, a method of monitoring a position of a handle includes providing a handle comprising a mounting block, an arm pivotally connected with the mounting block, a first sensor positioned along the mounting block, and a second sensor positioned along the arm, retrieving first positional information from the first sensor, retrieving second positional information from the second sensor, and comparing, by a controller, the first positional information with the second positional information. In some embodiments, the method further includes monitoring operational conditions of the material handling vehicle.

In some forms, the method further includes adjusting the operation of one of a lift motor or a drive motor of the material handling vehicle based on the comparison of the first positional information with the second positional information. In some embodiments, one of the first sensor or the second sensor is an accelerometer. In some embodiments, the first positional information includes a first position and a second position, and the second positional information includes a third position and a fourth position. In some embodiments, the second sensor is positioned along a grip of the arm.

DETAILED DESCRIPTION OF THE PREFERRED EMBODIMENT

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein.

The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention. Further, while the embodiments disclosed herein are intended for use with a material handling vehicle, those of ordinary skill in the art would recognize that such embodiments could also be used with user or operator compartments of other vehicles.

Turning to the figures, the following description and drawing figures pertain to embodiments directed toward the monitoring, by sensors, of one or more control handles provided on a material handling vehicle, e.g., in an operator compartment. The sensors can periodically and/or continuously obtain data and provide information to one or more controllers that is related to the angular position and/or angular rate of change of the one or more control handles. While embodiments of the invention will be described that include a control arm, one of ordinary skill in the art would recognize that other mechanisms for controlling one or more operations of the material handling vehicle may be used.

Figure 1:
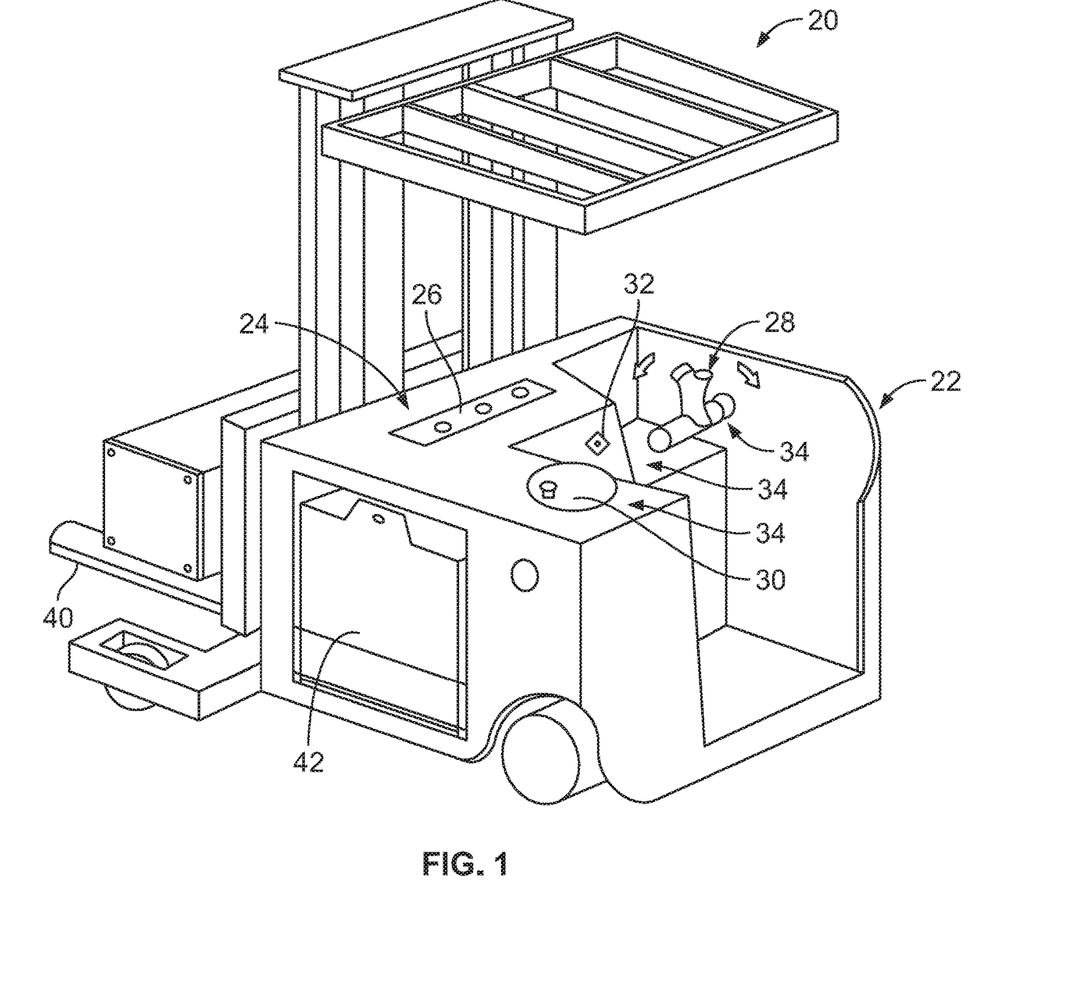
FIG. 1 is an isometric view of a material handling vehicle implementing the systems and methods disclosed herein.

Referring now to FIG. 1, a block diagram is illustrated of a typical material handling vehicle 20 in which embodiments of the present invention can be provided. The material handling vehicle 20 includes an operator compartment 22. Within the operator compartment 22 is a control system 24, which is operatively coupled with a controller 26 that receives operator input signals from drive components including one or more of an operator handle 28, a steer wheel 30, and a key switch 32. The control system 24 also may be in communication with a user interface. The handle 28, the steer wheel 30, and the key switch 32 are collectively referred to as a drive system 34 or individually as drive components. Based on the received signals, the control system 24 provides command signals to a lift motor 36 (see FIG. 4), a steer or drive motor 38 (see FIG. 4), or other components of the material handling vehicle 20. In some embodiments, the lift motor 36 drives one or more forks 40 to raise or lower a load (not shown). The electrical components of the material handling vehicle 20, including the drive system 34 and the control system 24, are powered by an energy source 42, which may comprise a battery. The energy source 42 can be coupled with the control system 24 and the drive system 34 through a bank of fuses or circuit breakers.

As noted above, the drive system 34 includes the key switch 32, the steering wheel 30, and the operator handle 28. The key switch 32 is activated to apply power to the control system 24, thereby enabling operation of the material handling vehicle 20. The operator handle 28 controls the lift motor 36, which is connected to a hydraulic circuit for driving the forks 40, thereby moving a load up or down, depending on the direction selected via the operator handle 28.

Figure 2:
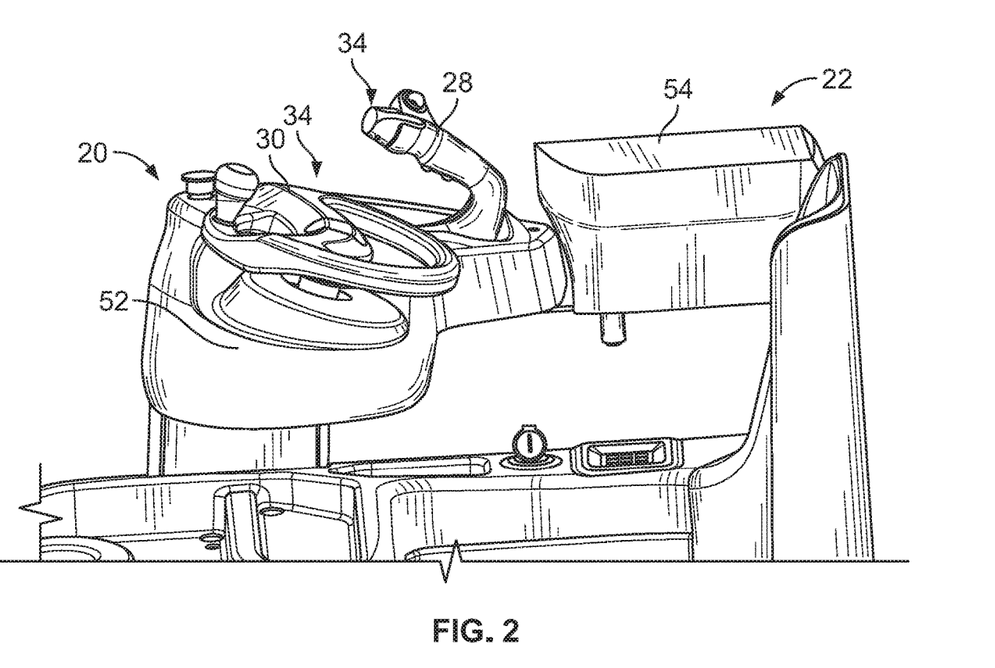
FIG. 2 is an isometric view of an alternative embodiment of an operator compartment of a material handling vehicle implementing the systems and methods disclosed herein.

Referring now to FIG. 2, an embodiment of an operator compartment of the material handling vehicle 20 is illustrated. During operation of the material handling vehicle 20, the operator can stand or sit within the operator compartment 22 behind an operator console 52, thereby allowing access to the drive system 34. In some embodiments, and as shown in FIG. 2, an arm rest 54 is provided adjacent the handle 28, and extends along a side 56 of the operator compartment 22.

Figure 3:
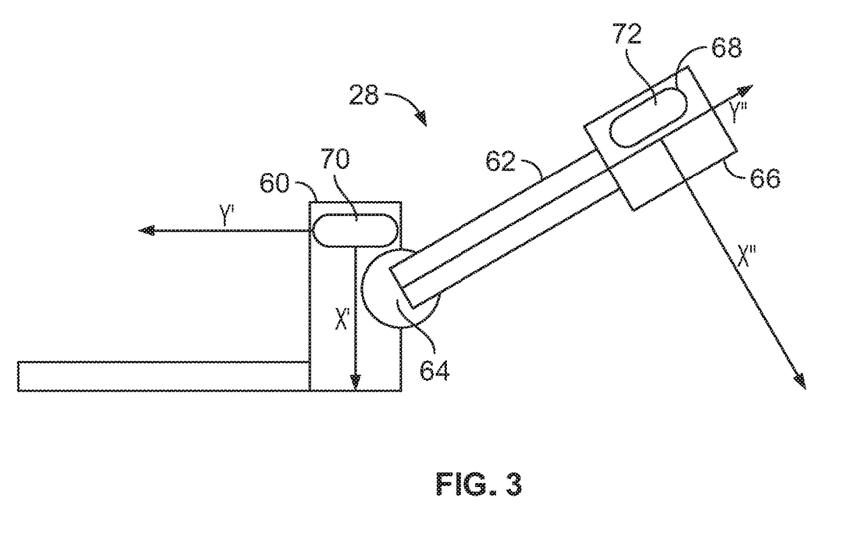
FIG. 3 is a side elevational schematic view of a handle as disclosed herein.

As illustrated in the schematic of FIG. 3, in some embodiments, the handle 28 can include a mounting block 60, an arm 62, a pivot 64 provided at least partially within the mounting block 60, the arm 62 pivotally coupled with the pivot 64, and a grip 66 provided at a distal end 68 of the arm 62. In other configurations, the handle 28 may not include one or more of the mounting block 60, the pivot 64, the arm 62, and/or the grip 66. Still further, in some embodiments, the arm 62 comprises multiple segments that may be offset by one or more angles, or that may be parallel with respect to one another.

In the illustrated embodiment, a first sensor 70 and a second sensor 72 are provided within the handle 28. The first sensor 70 can be positioned within the mounting block 60, or, alternatively, can be provided within the operator compartment 22. In some embodiments, the first sensor 70 can be positioned at some other location on or along the material handling vehicle 20. The second sensor 72 can be provided in the grip 66 of the handle 28, or, alternatively, may be positioned along the arm 62 of the handle 28. The first sensor 70 and the second sensor 72 can be located along different portions of the handle 28, or may be positioned along different portions or components of the material handling vehicle 20. In some embodiments, regardless of where positioned on or along the material handling vehicle 20, the first sensor 70 and the second sensor 72 are movable with respect to one another. The handle 28 may also have alternative configurations not specifically discussed herein.

Figure 4:
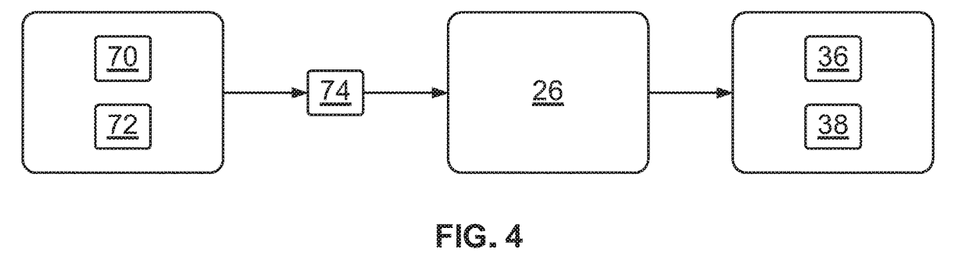
FIG. 4 is a block diagram illustrating the transfer of information from sensors disposed on the handle of FIG. 3.

In some embodiments, both the first sensor 70 and the second sensor 72 are accelerometers. The accelerometers described herein can be used to measure acceleration, but may have further measurement capabilities. Referring to FIG. 4, the sensors 70, 72 obtain information 74 and send the information 74 to the controller 26. The information 74 obtained by the sensors 70, 72 can allow for evaluation of overall vehicle performance and/or response of some components of the material handling vehicle 20. The information 74 retrieved by the sensors 70, 72 can be used to make adjustments to various vehicle subsystems as needed.

The sensors 70, 72 can be used to measure conditions such as vibration, inclination, dynamic distance, and/or speed with or without the influence of gravity. Further, one or both of the first sensor 70 and the second sensor 72 may be gyroscopes, which are useful for measuring or maintaining orientation of the material handling vehicle 20. Further, an additional sensor may be provided, which may be an accelerometer, a gyroscope, or some other sensing device known to those of ordinary skill in the art. In some embodiments, and as illustrated in FIG. 4, the controller 26 provides instructions to one or both of the lift motor 36 and the drive motor 38 based on the information 74 retrieved by the sensors 70, 72.

Figure 5:
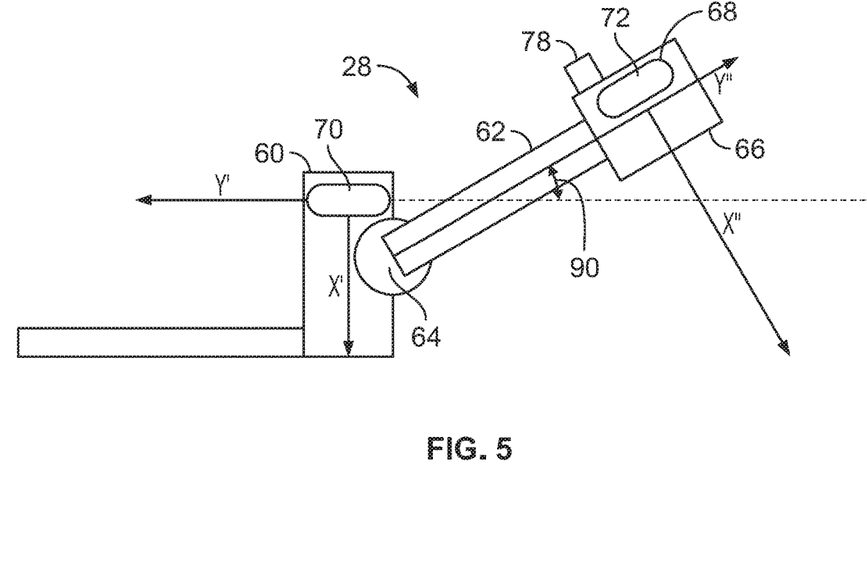
FIG. 5 illustrates the measured angle between the sensors of the handle of FIG. 3.

Referring to FIG. 5, sensors 70, 72 are configured to provide an absolute handle angular position on the material handling vehicle 20 by measuring an angle 90. The angular position of the handle 28 can be continually measured by comparing the measurements retrieved by the first sensor 70 with the measurements retrieved by the second sensor 72. The angle 90 of the handle 28 can be continually provided to the control system 24 of the material handling vehicle 20 or another controller internal to, or external to, the material handling vehicle 20. As described above, in some embodiments, the first sensor 70 can be stationary on the material handling vehicle 20, and the second sensor 72 can be provided in the handle 28.

Still referring to FIG. 5, the measured difference between the first sensor 70 and the second sensor 72 can provide a relative angle of the arm 62 with respect to the mounting block 60, and, thus, with respect to the material handling vehicle 20. In some embodiments, the information 74 provided by the periodic and/or continuous monitoring of the sensors 70, 72 allows the controller 26 to determine a roll, pitch, and/or yaw of the frame of the material handling vehicle 20, i.e., a truck inclination angle. Through the use of two accelerometers on the vehicle 20, i.e., the first sensor 70 and the second sensor 72, the angle 90 can be continuously determined and used for feedback. As previously discussed, in some embodiments this can be accomplished by having the first sensor 70 on the handle 28 or on the material handling vehicle 20 and the second sensor 72 fixedly attached to the handle 28, however, in some embodiments, the first sensor 70 and the second sensor 72 are both movably attached to the material handling vehicle 20.

The angle 90 moves relative to the material handling vehicle 20, which allows a difference in the gravity vectors to be measured. As previously noted, in some embodiments a gyroscope 78 can be added to the system, which can provide additional sensed information to the controller 26. Adding the gyroscope 78 can allow the measurement of rotation of the first sensor 70 and the second sensor 72 with respect to each other and the material handling vehicle 20.

Calibration of the sensors 70, 72 can be used to understand the initial condition relationship with which the angle 90 can be measured. In some instances, the sensors 70, 72 can be re-calibrated to remove error due to drift in calculated values based on other sensor data acquired from truck sensor inputs. These inputs can include truck speed and acceleration, environmental temperature, electrical system voltage, or any other input.

Figure 6:
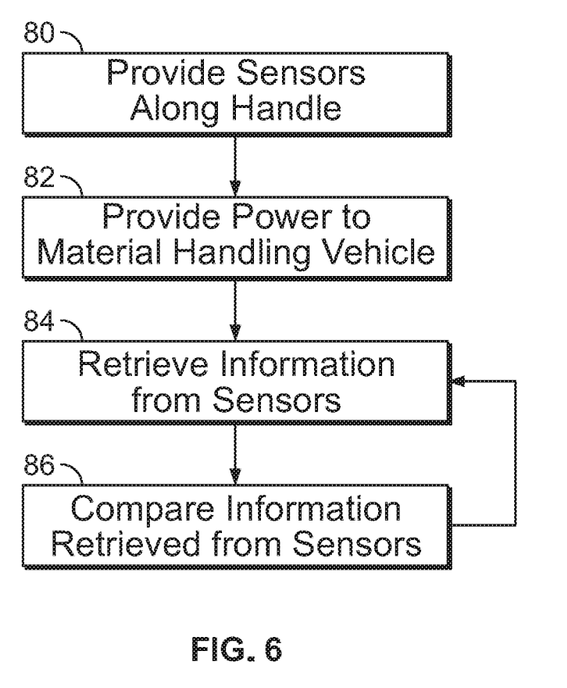
FIG. 6 is a block diagram illustrating a method of monitoring a position of the handle of FIG. 3.

Referring to the block diagram of FIG. 6, the method depicted illustrates how the sensors 70, 72 can provide the information 74 to the material handling vehicle 20. In a first step 80 of the method, the first sensor 70 and the second sensor 72 are positioned along different segments of the operator handle 28. Next, in a second step 82, power is provided to the sensors 70, 72 such that the sensors 70, 72 are in an operable mode. Referring to a third step 84, the sensors 70, 72 provide information 74, such as periodic and/or continuous positional information of the sensors 70, 72, to the controller 26, which may be a truck control system (not shown). In some embodiments, a first position of one or both of the sensors 70, 72 is provided to the controller 26, after which, information related to subsequent positions, i.e., a second position, a third position, a fourth position, etc., are provided to the controller 26. Any number of positions of the sensors 70, 72 may be provided to the controller during use of the material handling vehicle 20.

After information related to at least two positions of the sensors 70, 72 have been provided to the controller 26, in a fourth step 86, the controller 26 compares the information 74 and outputs a command to one or more of the motors 34, 36, or any other electrical component of the material handling vehicle 20. After step 86, the method can return to step 84, and may continuously monitor the sensors for information. In some embodiments, continuously comparing the first position of one or both of the sensors 70, 72 with respect to the second position of one or both of the sensors 70, 72 can provide a continuous change in relative angle of the sensors 70, 72, which allows for continuous self-tests for the control system 24, and can provide for the control system 24 to determine any of the pitch, roll, and yaw of the frame of the material handling vehicle 20.

By utilizing continuous feedback, performance tuning of the material handling vehicle 20 can be accomplished and traction speed can be controlled based on the position of the handle 28.

The foregoing description was primarily directed to embodiments of the invention. Although some attention was given to various alternatives within the scope of the disclosed embodiments, it is anticipated that one skilled in the art will likely realize additional alternatives that are now apparent from disclosure of embodiments of the invention. Accordingly, the scope of the invention should be determined from the following claims and not be limited by the above disclosure.

What is claimed is:

1. A system for monitoring a position of a handle for controlling a component of a material handling vehicle, the system comprising:
   a mounting block;
   an arm pivotally connected with the mounting block;
   a first sensor positioned along the mounting block;
   a second sensor positioned along the arm; and a controller configured to:
: retrieve a first signal indicative of a first position of the mounting block from the first sensor;
: retrieve a second signal indicative of a second position of the arm from the second sensor;
: compare the first position with the second position to continuously monitor an operational condition of the material handling vehicle;
: adjust operation of at least one of a lift motor and a drive motor based on the comparison of the first position with the second position; and
: recalibrate the first sensor and the second sensor.

2. The system of claim 1, wherein the first sensor is an accelerometer, and the second sensor is an accelerometer.

3. The system of claim 1, wherein one of the first sensor or the second sensor is a gyroscope.

4. The system of claim 1, wherein the controller is further configured to output a command to a truck control system based on the comparison of the first position with the second position.

5. The system of claim 1, further comprising a grip provided at a distal end of the arm.

6. The system of claim 1, wherein the controller is further configured to output information to a user interface related to the comparison of the first position with the second position.

7. A system for monitoring a position of a drive component of a material handling vehicle, the system comprising:
: a drive component;
: a first sensor positioned along the material handling vehicle;
: a second sensor positioned along the drive component; and
: a controller configured to:
:: retrieve first positional information from the first sensor;
:: retrieve second positional information from the second sensor;
:: continuously compare the first positional information with the second positional information;
:: adjust operation of at least one of a lift motor and a drive motor based on the comparison of the first position with the second position; and
:: recalibrate the first sensor and the second sensor.

8. The system of claim 7, wherein the drive component is a handle.

9. The system of claim 8, wherein the second sensor is positioned along a grip of the handle and the first sensor is positioned along a mounting block of the handle.

10. The system of claim 9, wherein the handle operates at least one of the lift motor and the drive motor of the material handling vehicle.

11. The system of claim 7, wherein the controller is further configured to monitor operational conditions of the material handling vehicle.

12. The system of claim 7, wherein the controller is a truck control system.

13. A method of monitoring a position of a handle, the method comprising:
: providing a handle comprising a mounting block, an arm pivotally connected with the mounting block, a first sensor positioned along the mounting block, and a second sensor positioned along the arm;
: retrieving first positional information from the first sensor;
: retrieving second positional information from the second sensor;
: continuously comparing, by a controller, the first positional information with the second positional information;
: adjusting operation of at least one of a lift motor and a drive motor based on the comparison of the first position with the second position; and
: recalibrating the first sensor and the second sensor.

14. The method of claim 13, further comprising monitoring operational conditions of a material handling vehicle.

15. The method of claim 13, wherein one of the first sensor or the second sensor is an accelerometer.

16. The method of claim 13, wherein the first positional information includes a first position and a second position, and the second positional information includes a third position and a fourth position.

17. The method of claim 13, wherein the second sensor is positioned along a grip of the arm.

* * * * *